United States Patent [19]
Montalcini et al.

[11] Patent Number: 5,285,394
[45] Date of Patent: Feb. 8, 1994

[54] ELECTRONIC POLYNOMIAL INTERPOLATION DEVICE FOR NUMERIC CONTROLS OF MACHINE TOOLS, PARTICULARLY MILLING MACHINES FOR THE MACHINING OF DIES, AND MACHINE COMPRISING SAID DEVICE

[75] Inventors: Piera L. Montalcini; Antonio Racciu, both of Turin, Italy

[73] Assignee: Advanced Data Processing ADP S.r.l., Turin, Italy

[21] Appl. No.: 545,730

[22] Filed: Jun. 29, 1990

[30] Foreign Application Priority Data
Jul. 5, 1989 [IT] Italy .................. 67551 A/89

[51] Int. Cl.$^5$ .................. G06F 15/46; G06F 1/02
[52] U.S. Cl. .................. 364/474.31; 364/718
[58] Field of Search .................. 364/474.31, 474.28, 364/723, 718, 577; 318/573

[56] References Cited
U.S. PATENT DOCUMENTS

| | | | |
|---|---|---|---|
| 4,581,698 | 4/1986 | Jaswa . | |
| 4,603,286 | 7/1986 | Sakano . | |
| 4,663,726 | 5/1987 | Chand et al. . | |
| 4,866,631 | 9/1989 | Kuragano et al. | 364/474.31 |
| 4,961,150 | 10/1990 | Seki et al. | 364/474.31 |
| 5,060,133 | 10/1991 | Carter, II | 364/474.31 |
| 5,060,181 | 10/1991 | Matsuoka | 364/718 |
| 5,132,913 | 7/1992 | Siki et al. | 364/474.31 |

FOREIGN PATENT DOCUMENTS
1424767 2/1976 United Kingdom .

Primary Examiner—Long T. Nguyen
Assistant Examiner—Thomas E. Brown
Attorney, Agent, or Firm—Guido Modiano; Albert Josif

[57] ABSTRACT

The device comprises a first section, which comprises logic circuit device which generate the law of motion along the machine operative trajectory arc, and a second section with a set of three digital polynomial generators, each of which receives from the motion law generator the instantaneous value of the curvilinear coordinate and, from an external processing unit, the polynomial coefficients related to the trajectory arc to be generated and the sampling and sub-sampling pulses; the polynomial generators of the second section are suitable for providing, on the respective outputs, the corresponding components of the instantaneous speed vectors of each point of the trajectory, generated by adding and multiplying the polynomial coefficients and the curvilinear coordinate.

16 Claims, 5 Drawing Sheets

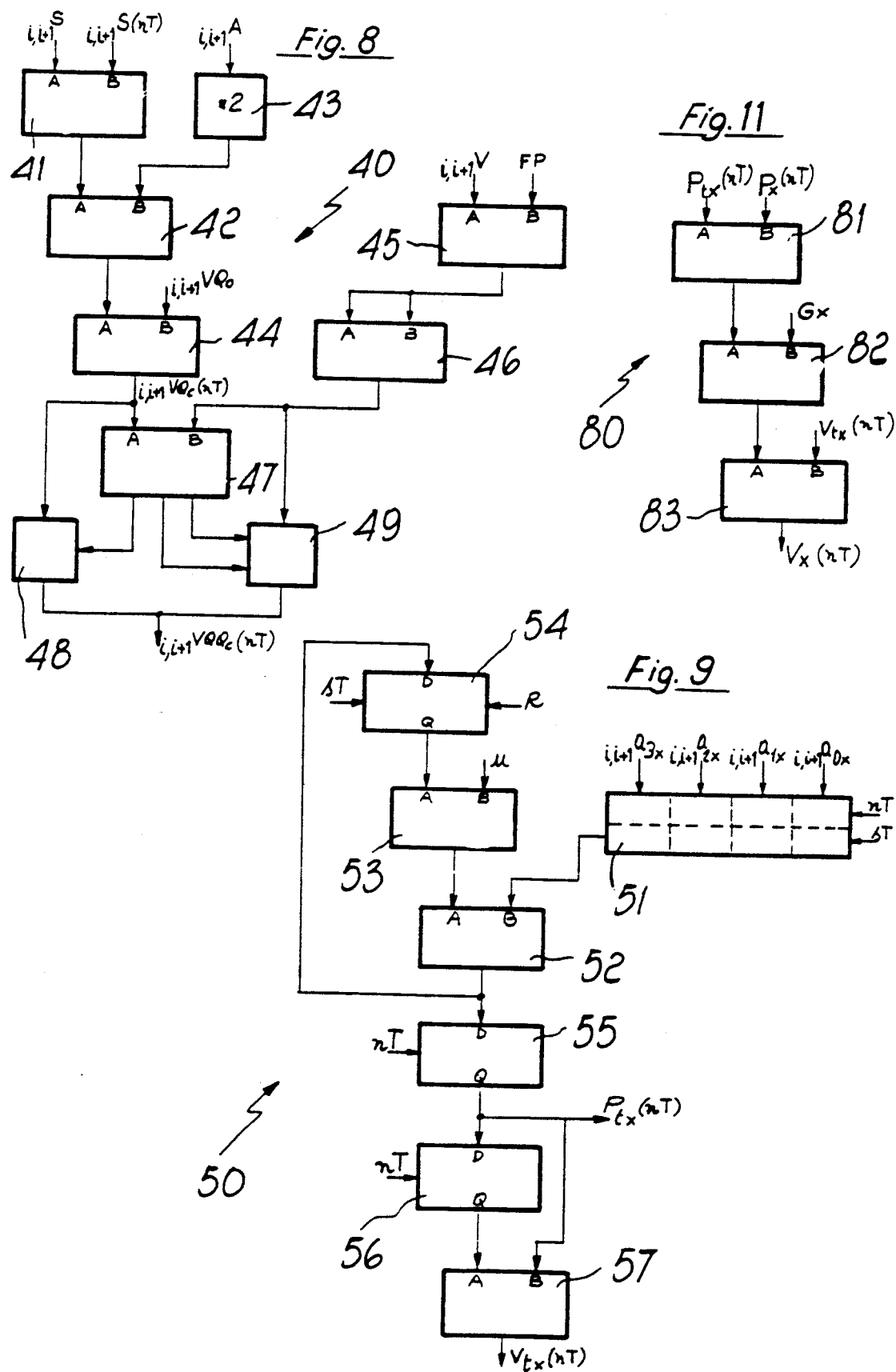

ELECTRONIC POLYNOMIAL INTERPOLATION DEVICE FOR NUMERIC CONTROLS OF MACHINE TOOLS, PARTICULARLY MILLING MACHINES FOR THE MACHINING OF DIES, AND MACHINE COMPRISING SAID DEVICE

BACKGROUND OF THE INVENTION

The present invention relates to an electronic polynomial interpolation device for numeric controls of machine tools, particularly milling machines for the machining of dies, and to a machine which comprises said device.

In the machining of metallic dies made of steel, cast iron or aluminum and intended for the production of articles made of sheet metal or plastic or composite materials, the completely automatic finishing of said die by means of machine tools has now become fundamentally important.

Manual restarting of the finishing operations is in fact a task which requires great specialization and very long times, with consequent unacceptable production costs.

In the design of dies, the appearance of computerized systems commonly known by the acronym CAD (Computer Aided Design) has allowed to mathematically define the surface of said die, regardless of its complexity, and to consequently generate parameters. When these parameters are processed by other computerized systems commonly known by the acronym CAM (Computer Aided Manufacturing), suitable for generating trajectories, they allow, by means of the numeric control system, to move the tool of the machines so as to reproduce the mathematically expressed surfaces.

The greatest disadvantage of these known automation systems currently consists of the interaction between the CAM systems and numeric controls due to the intrinsic limitations of the latter.

Currently known numeric controls in fact require the trajectory of the path of the tool, which is generated by a CAM system starting from the mathematical definition of the surface of the part to be machined, to be a broken line, generally with a large number of segments in order to contain chordal error. This, first of all, significantly limits the advancement speeds of the tool, which decrease as the allowed chordal error decreases and in any case become critical for values in the range of 10,000 mm/min due to the large amount of data to be processed.

The intrinsic nature of broken-line trajectories in any case leads, even if chordal error is kept within very narrow limits, to the generation of "faceted" surfaces which require the subsequent and undesirable manual finishing of the die.

SUMMARY OF THE INVENTION

The aim of the present invention is to eliminate these disadvantages, and, within the scope of this general aim, said invention has the important object of providing an electronic device which is suitable for directly interpolating tool trajectory arcs which are represented by polynomials of the n-th degree and are expressed as a function of a parameter, hereinafter termed curvilinear coordinate, which varies between zero and the length of said section of trajectory, thus obtaining corresponding continuous surfaces of the machined part which require no manual finishing intervention.

Another important object of the present invention is to provide a device which can significantly increase the tool movement speed and allow the acceleration and deceleration of the movement in the trajectory arc being considered, thus ensuring the correct blending together of contiguous arcs, even in the presence of blendings in which the surface has points of marked discontinuity (for example salient cusps).

A further object of the present invention is to provide an interpolation device which has a simple circuit structure, is highly reliable in operation and is suitable for being interfaced with any machine tool with at least three degrees of freedom and with any CAM trajectory generation system.

In order to achieve this aim, these important objects and others which will become apparent from the following detailed description, the present invention relates to an electronic polynomial interpolation device for numeric controls of machine tools, particularly milling machines for the machining of dies, characterized in that it comprises a first section which includes digital means for generating the law of motion and for calculating the curvilinear coordinate along the operative trajectory arc of the machine and a second section which comprises a set of three digital polynomial generators, each of which receives from the first section the instantaneous value of the curvilinear coordinate of the trajectory or portion of trajectory, the polynomial coefficients related to the trajectory arc to be generated, provided by an external processing unit and the sampling and sub-sampling pulses, the polynomial generators being suitable for providing, on their outputs, the corresponding components of the instantaneous position vector and of the instantaneous speed vector of each point of the trajectory calculated by adding and multiplying the polynomial coefficients and the curvilinear coordinate.

The first section generates a speed diagram according to the law of uniformly accelerated motion, along the ends of the trajectory arc being considered, by adding and subtracting constant-value acceleration steps by means of binary adders and accumulators.

In the second section, each polynomial generator comprises a register for the parallel accumulation of the polynomial coefficients, the serial output whereof is operatively connected to a chain which comprises an adder and an accumulator which, activated by the sub-sampling pulses, compute the polynomial which represents the trajectory reduced to a recursive form consisting of additions and multiplications.

The speed outputs of each polynomial generator are operatively connected, with the interposition of a register, of a digital/analog converter and of an operational amplifier, to the motor for the actuation of the tool along the respective coordinated axis. A fixed optical rule and an optical sensor moved by the drive shaft provide a datum which corresponds to the actual instantaneous position of the tool with respect to said axis; the actual position is compared with the theoretical one in order to obtain a positive or negative correction datum in terms of speed to be sent to the actuation motor.

BRIEF DESCRIPTION OF THE DRAWINGS

Further characteristics, purposes and advantages will become apparent from the following detailed description and with reference to the accompanying drawings, given by way of non limitative example, wherein:

FIG. 9 is a detailed block diagram of one of the polynomial generators of the second section of the interpolation device, FIG. 11 is a detailed block diagram of the means for comparing the actual position with the theoretical position of the tool in order to generate a correction signal.

DESCRIPTION OF THE PREFERRED EMBODIMENTS

Figure 1:
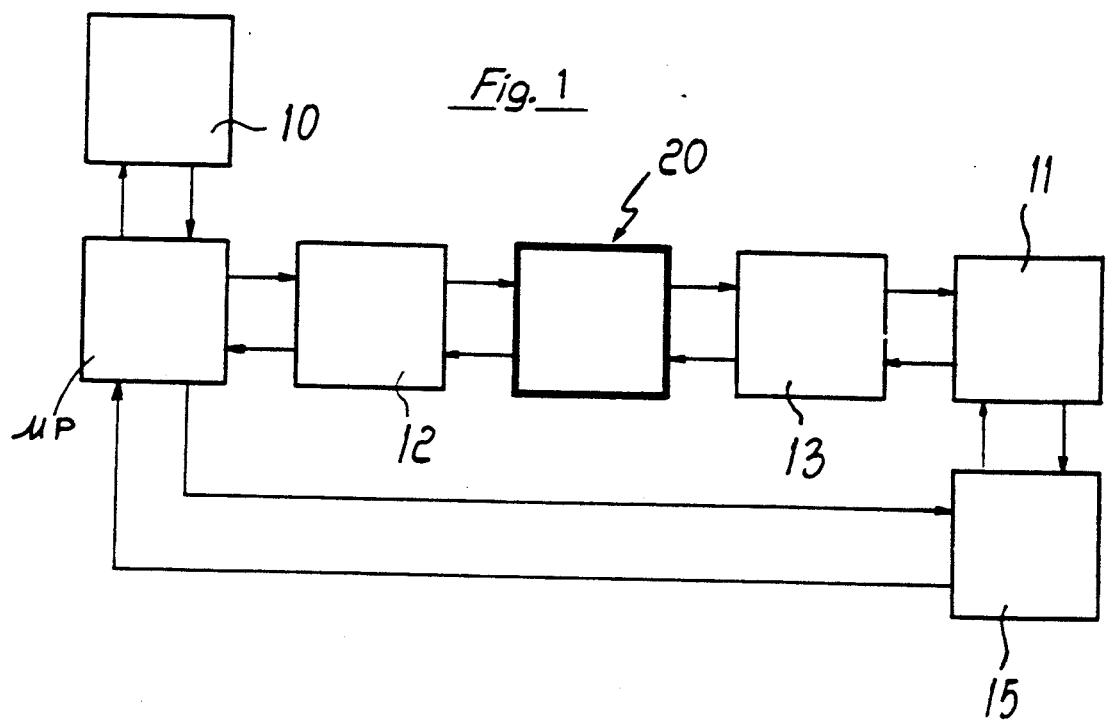
FIG. 1 is a block diagram of an automatic numeric-control actuation system for a machine tool which comprises the polynomial generation device according to the present invention.

In the diagram of FIG. 1, the reference numeral 10 indicates a known CAD-CAM system for mathematically expressing generic surfaces and for generating tool trajectories starting from the mathematical definition of the surface.

The reference numeral 11 indicates a generic machine tool, for example a milling machine, which is operatively connected to the system by means of a microprocessor $\mu P$, an interface 12 provided with a memory, a control module 13 and the polynomial interpolation device according to the invention, which is generally indicated by the reference numeral 20. A programmable logic unit 15, controlled by the microprocessor $\mu P$, is furthermore provided for the auxiliary functions of the machine tool 11, such as cooling and lubrication pump management, temperature sensing and checking and the like, and programming of the speed of the tool-holder spindle.

The system 10 generates the trajectory of the tool in the form of numeric data and sends the data to the microprocessor $\mu P$, which stores them in the memory of the interface 12. By means of the same interface 12, the microprocessor $\mu P$ sends the data to the interpolator 20 which, at discrete time intervals, generates the speed and position of the axes of the machine tool 11.

Depending on the actual position of the axes of the machine 11, the control module 13 corrects the position at discrete time intervals so that the trajectory followed by the tool is as close as possible to the theoretical one generated by the system 10.

Figure 2:
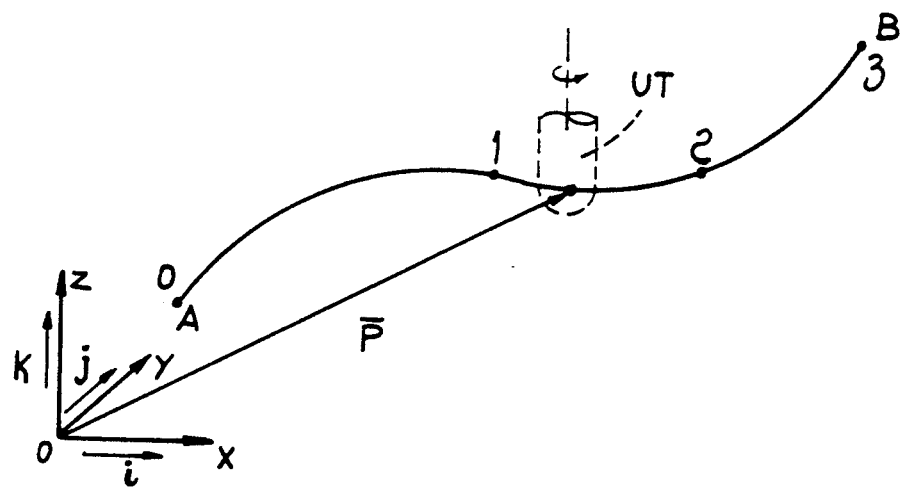
FIG. 2 is a diagram of a generic trajectory of the r-th degree followed by the tool of the machine of FIG. 1.

FIG. 2 illustrates a generic trajectory A-B which indicates the positions assumed in the course of time by the tool UT of the machine 11. A generic position of the tool is indicated by the vector P referred to a set of three Cartesian coordinates x-y-z and is expressed as follows:

$$P = Px \cdot i + Py \cdot j + Pz \cdot k \tag{1}$$

where i, j and k are the unit vectors of the set of three Cartesian coordinates.

The components Px-Py-Pz of the vector are represented by respective polynomials of the r-th degree expressed as a function of a parameter "u" which is termed curvilinear coordinate and varies between 0 (zero) and the length of the trajectory:

$$P_x = a_{rx}u^r + a_{(r-1)x} u^{r-1} + \ldots a_{1x}u + a_{\phi x} \tag{2}$$
$$P_y = a_{ry}u^r + a_{(r-1)y} u^{r-1} + \ldots a_{1y}u + a_{\phi y}$$
$$P_z = a_{rz}u^r + a_{(r-1)z} u^{r-1} + \ldots a_{1z}u + a_{\phi z}$$

The degree r of the polynomial can be rather high ($r >= 11$) in the case of complex trajectories. The entire trajectory can however be divided into sub-trajectory portions of a degree $m <= r$; in particular, it is advantageous to divide the trajectory into portions represented by polynomials which can be expressed by means of expressions (2), in which m=3 (cubic expressions).

The interpolator device 20 is provided, as input data, with the coefficients of the polynomials represented in (2), the curvilinear length of the sub-trajectory arc $_{i,i+1}S$, the speed $_{i,i+1}V$ at which the sub-trajectory is to be followed, the maximum acceleration $_{i,i+1}A$ allowed along the subtrajectory and the squared exit speed $_{i,i+1}VQ_o$, as well as with a percentage factor FP provided by the microprocessor $\mu P$.

Furthermore, since the system is of the sampled numeric type, the device 20 is also supplied with sampling pulses nT, where T is the sampling interval (for example T=1 ms), and with sub-sampling pulses sT; n is the set of integers comprised between $-\infty$ and $+\infty$ and s=n+h/(m+1), where h varies between 0 (zero) and (m+1) with m equal to the degree of the polynomials to be generated.

Figure 3:
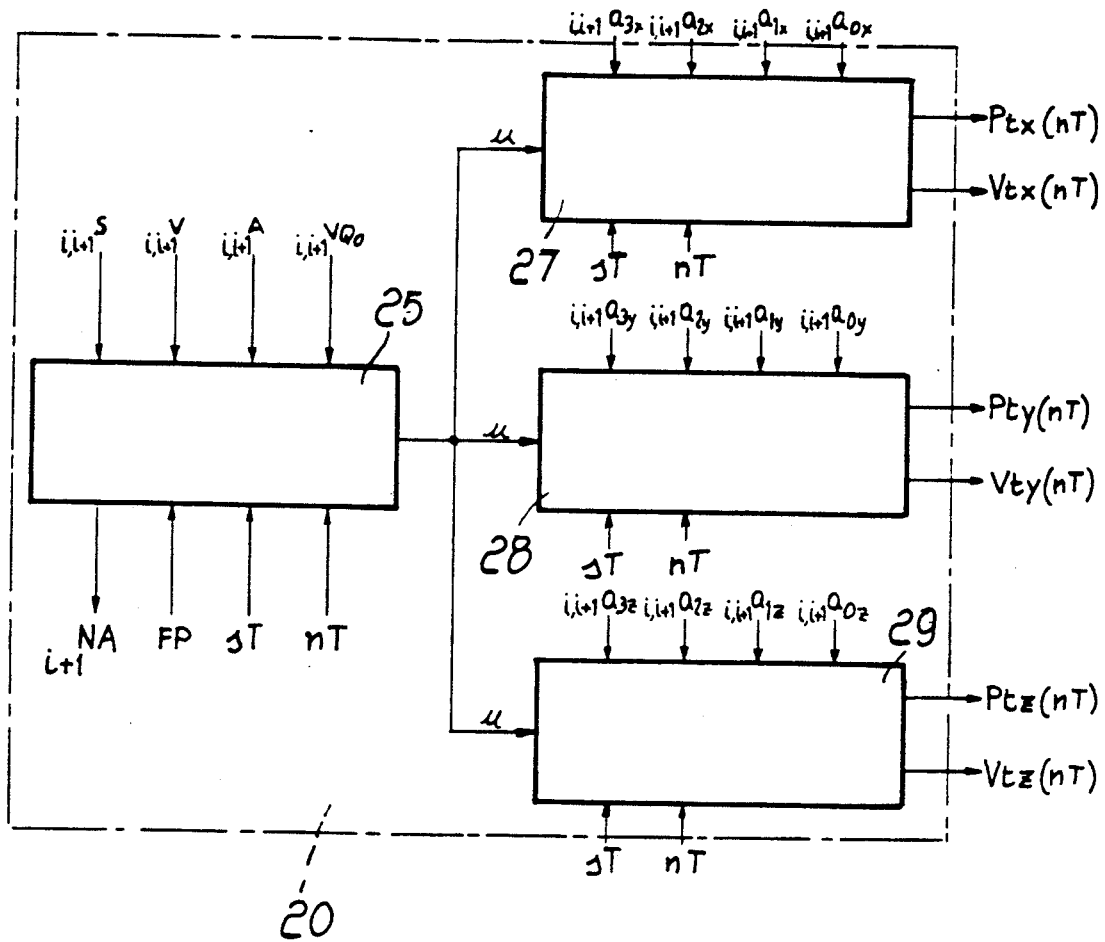
FIG. 3 is a block diagram of the interpolation device according to the invention.

With reference to FIG. 3 the device 20 substantially comprises a first section 25 which constitutes the generator of the law of motion along the trajectory arc and a second section composed of a set of three polynomial generators 27, 28, 29 which will be described hereinafter.

Figure 4:
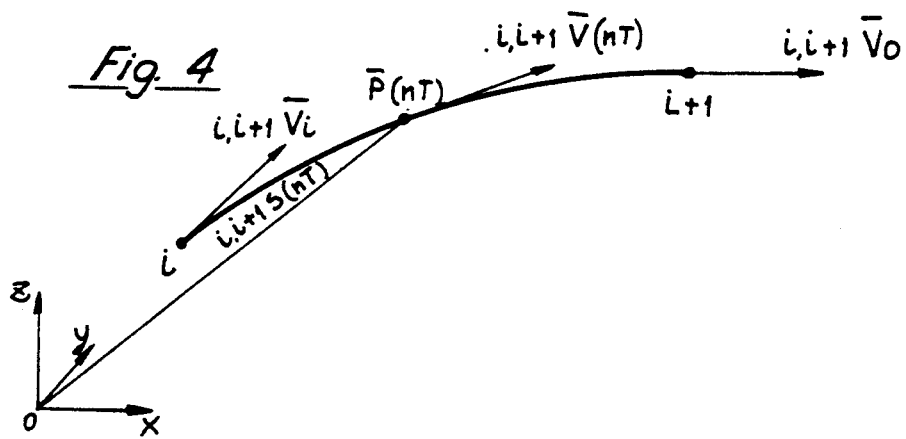
FIGS. 4, 5 and 6 are explanatory diagrams related to the first section of the interpolation device of FIG. 3, FIGS. 7 and 8 are detailed block diagrams of the first section of the interpolation device.

The task of the section 25 is to calculate, at discrete intervals nT, the position and the speed at the point P(nT). The notations of FIG. 4 are used; said figure illustrates a sub-trajectory arc i,i+1. The curvilinear coordinate $_{i,i+1}S(nT)$ is the position, at discrete intervals nT, of the vector P(nT) with respect to the origin of the arc i, the value $_{i,i+1}V(nT)$ is the vectorial speed at discrete intervals nT; $_{i,i+1}V_i$ and $_{i,i+1}V_o$ are the vectorial speeds of input into and output from the sub-trajectory arc.

Figure 5:
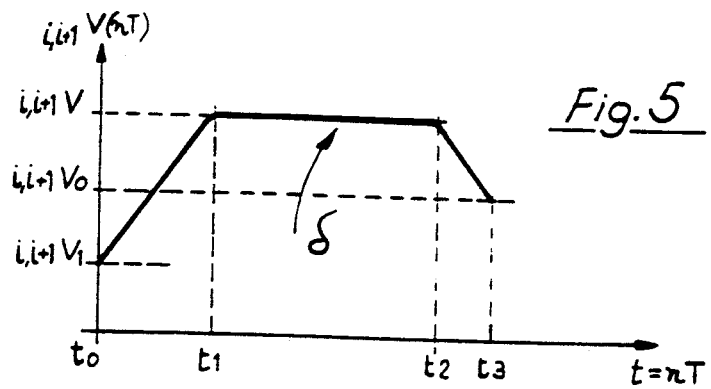

The law of motion along the sub-trajectory arc being considered is of the uniformly accelerated type and is plotted on speed and time coordinates in the diagram "δ" of FIG. 5.

Figure 6:
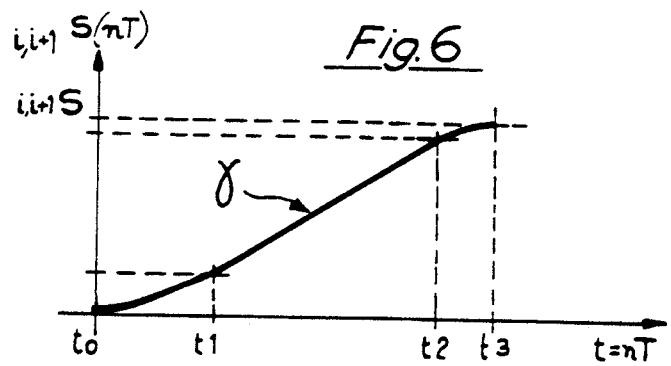
Figure 7:
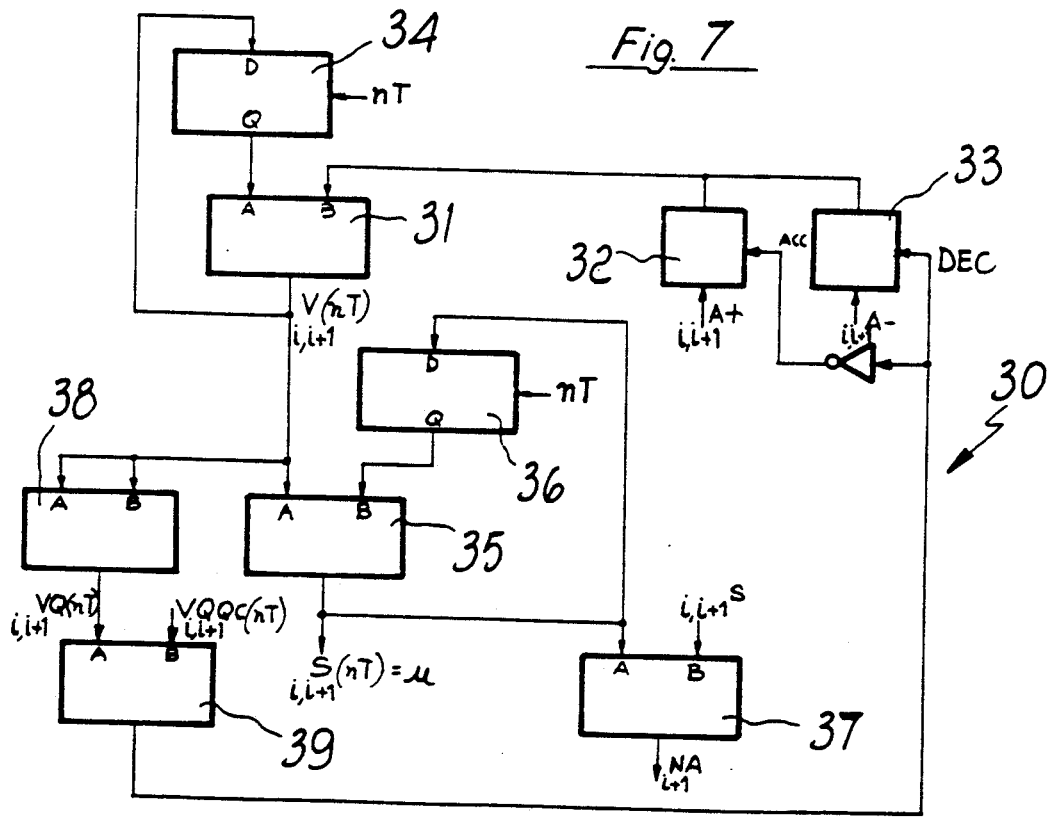

A first logic circuit 30 (FIG. 7) of the first section 25 calculates the speed $_{i,i+1}V(nT)$ at the instant nT and, by integrating said speed, calculates the value of the curvilinear coordinate $u = _{i,i+1}S(nT)$, the trend whereof is expressed in time by the curve "γ" of FIG. 6.

For this purpose, the logic circuit 30 comprises a first binary adder 31 which, at intervals nT, performs the sum between the speed V[(n-1)T] and the positive or negative acceleration steps $_{i,i+1}A+$, $_{i,i+1}A-$ present at the outputs of respective selectors 32-33.

The result of the sum operation is stored in an accumulator 34 so as to have available, at every instant, the speed datum related to the preceding instant. The accumulator 34 is reset at the beginning of each sub-trajectory. A second adder 35 integrates the speed V(nT) to obtain the curvilinear coordinate S(nT)=u by adding, at each instant nT, the speed V(nT) to the curvilinear coordinate related to the preceding instant (n-1)T stored in a respective second accumulator 36. A comparator 37 compares the curvilinear coordinate $_{i,i+1}S(nT)$ and the total curvilinear distance $_{i,i+1}S$ to recognize the end of the sub-trajectory arc and generate a signal $_{i+1}NA$ indicating a new arc. A multiplier circuit 38 furthermore calculates the square $VQ(nT)$ of the speed $V(nT)$ and a comparator 39 compares said squared value with a control value $VQQ_c(nT)$ which is calculated by a second logic circuit 40 (FIG. 8) of the section 25, in order to provide a criterion for the activation of the selector 32 or of the selector 33 depending on whether acceleration or deceleration is to be performed along the sub-trajectory being considered.

In order to calculate the control value $VQQ_c(nT)$, having selected uniformly decelerated motion, in order to reach the quadratic value $_{i,i+1}VQ_o$ of the speed it is necessary to check, at each instant, that the difference $$_{i,i+1}VQ(nT) - _{i,i+1}VQ_o$$

is always smaller than twice the product of the acceleration $_{i,i+1}A$ and the space $[_{i,i+1}S] - [_{i,i+1}S(nT)]$ which is still to be lowered to end the sub-trajectory arc, and it is necessary to decelerate if the difference between said squared speed exceeds the indicated value.

This check is performed by the circuit 40, wherein a binary subtractor 41 performs the subtraction $[_{i,i+1}S]-[_{i,i+1}S(nT)]$, and a first binary multiplier 42 performs the product of the subtraction and of the acceleration $_{i,i+1}A$ which has been pre-multiplied by two in a binary duplicator 43. An adder 44 adds the output value of the multiplier 42 to the square of the speed $_{i,i+1}VQ_o$ of output from the sub-trajectory arc, and two multiplier circuits 45, 46 calculate the square of the product between the maximum allowed speed $_{i,i+1}V$ and the percentage factor FP.

A comparator 47 compares the outputs of the adder 44 and of the multiplier 46 and drives two selectors 48, 49 which always give the comparison value $_{i,i+1}VQQ_c(nT)$ the smallest of the two values which input said comparator.

The output $u = _{i,i+1}S(nT)$ of the first section 25 is multiplexed at the input of the polynomial generators 27, 28, 29 which compose the second section of the device 20; each of the generators has the purpose of generating discrete positions and discrete speeds for each of the axes X, Y and Z along which the tool UT of the machine 11 moves.

For this purpose, each polynomial generator comprises a logic circuit 50, which is illustrated in detail in FIG. 9, and which, by successive sums and multiplications of the polynomial coefficients and of the curvilinear coordinate, calculates the respective polynomial (2) reduced to the following recursive form (for r=3):

$$_{i,i+1}P_x = [(_{i,i+1}a_{3x}\cdot u + _{i,i+1}a_{2x})\cdot u + _{i,i+1}a_{1x}]\cdot u + _{i,i+1}a_{\phi x}$$

and likewise for the components Py and Pz.

The circuit is substantially composed of a shift register 51 in which the coefficients of the polynomial to be generated are accumulated in parallel and at each sampling instant nT; in the case of a cubic polynomial, the coefficients are of the following type:

$$_{i,i+1}a_{3x};\ _{i,i+1}a_{2x};\ _{i,i+1}a_{1x};\ _{i,i+1}a_{\phi x}.$$

The sub-sampling pulses sT (in the case of m=3, a cubic polynomial, four sub-sampling pulses for each sampling pulse) also input the register 51. At each sub-sampling pulse sT, a coefficient of the polynomial inputs a binary adder 52 starting from $_{i,i+1}a_{3x}$ and followed, in the subsequent sub-sampling intervals, by $$_{i,i+1}a_{2x};\ _{i,i+1}a_{1x} \text{ and finally by } _{i,i+1}a_{\phi x}.$$

A binary multiplier 53 performs, again at each sub-sampling interval, the product of the curvilinear coordinate $u = _{i,i+1}S(nT)$ and of the output value of the adder 52 at the preceding instant, which is stored in an accumulator 54; the accumulator 54 is reset at each sampling interval nT by a reset pulse R. In this manner, the polynomial Px reduced to its recursive form is calculated at each sampling cycle nT.

A first register 55 and a second register 56, as well as a binary subtractor 57, are arranged at the output of the binary adder 52. The datum of theoretical position $P_{tx}(nT)$ is taken from the first register 55. The theoretical speed datum $V_{tx}(nT)$ is taken from the output of the subtractor 57 and is obtained by means of the subtraction of the position at the instant nT from the position at the preceding instant $(n-1)T$ which is performed by said subtractor 57.

Figure 10:
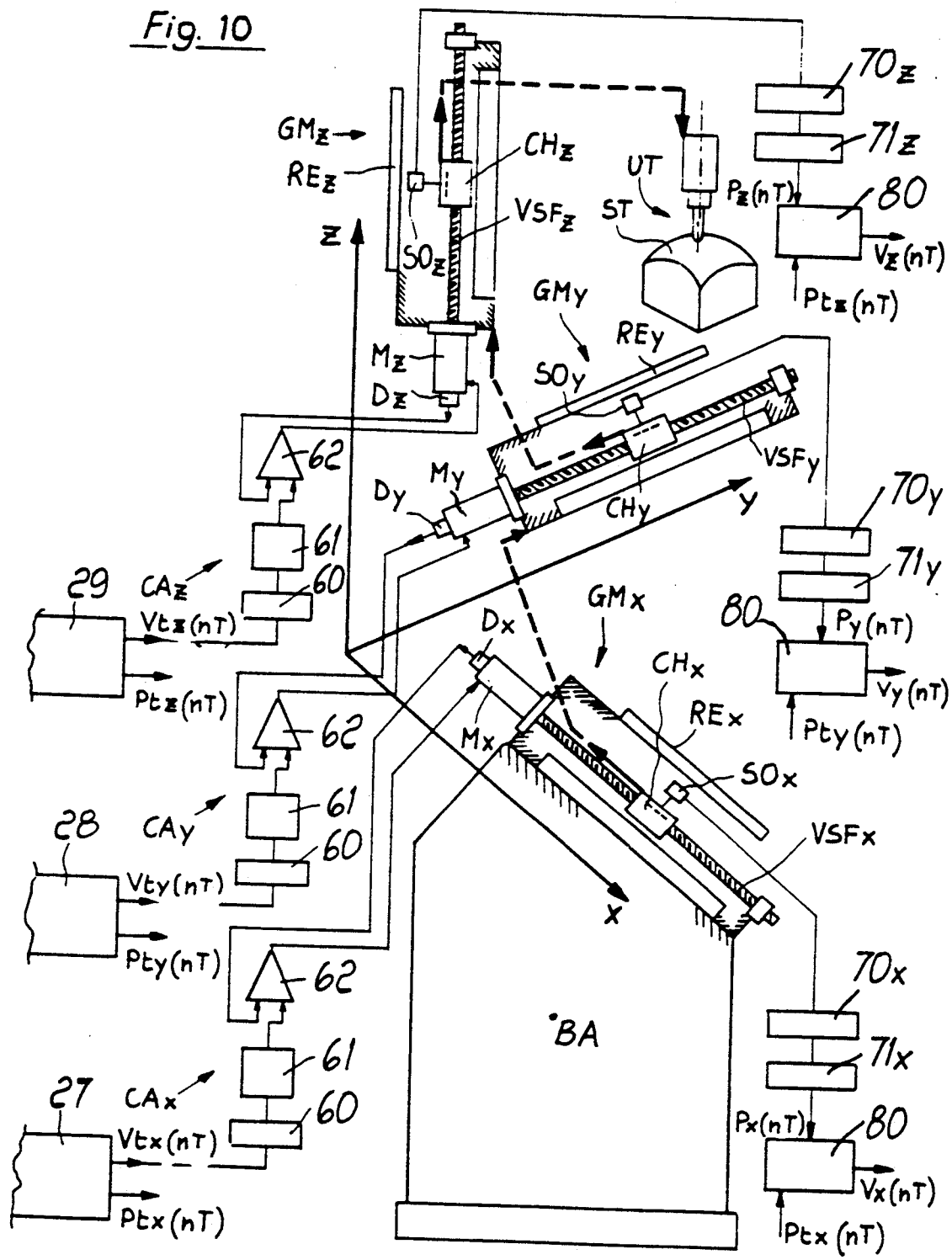
FIG. 10 is a schematic view of a machine tool with three degrees of freedom and of the manner in which it is driven with the device according to the invention.

As shown in detail in FIG. 10, the outputs $V_{tx,y,z}(nT)$ of the polynomial generators 27, 28 and 29 feed, with converter and amplifier units CAx, CAy, CAz interposed, respective motors Mx, My, Mz of the machine tool. Each converter and amplifier unit comprises a register 60, a digital/analog converter 61 and a multistage operational power amplifier 62 feedback by a speedometer generator Dx, Dy, Dz actuated by the respective motor.

The motor Mx is associated with a movement unit GMx which is rigidly coupled to the base BA of the machine and comprises a ball bearing nut CHx which is moved, along the x axis, by a worm screw VSFx which is moved by the motor Mx.

Similarly, the motor My is associated with an identical movement unit GMy which however, differently from the unit GMx, is movable along the y axis and is moved along the y axis by the nut CHx of the unit Mx. In turn, the nut CHy of the unit GMy, which is movable along the y axis and is actuated by the screw VSFy, moves the entire unit GMz along the z axis; the tool UT which generates the die ST, is supported in a known manner by a mandrel which rotates at a programmed speed, and it is rigidly associated with the nut CHz which is also movable along the z axis and is actuated by the screw VSFz.

A micro-line optical rule REx, REy and REz is rigidly associated with the frame of each movement unit, and a respective optical sensor SOx, SOy, SOz co-operates with each rule; the signals of the sensors SOx, SOy, SOz are converted, by means of respective position counters $70_{x,y,z}$ and registers $71_{x,y,z}$, into a datum which corresponds to the actual positions Px(nT), Py(nT) and Pz(nT) of the tool. A set of three logic circuits 80 compares the actual positions with the theoretical ones calculated by the polynomial generators 27, 28, 29 in order to generate a correction signal $V(nT)_{x,y,z}$ in terms of speed.

For this purpose, as illustrated in the detail of FIG. 11, each circuit 80 comprises a subtractor 81 which calculates the difference between the theoretical position and the actual one, a multiplier 82 which performs the product of the result of the subtraction and of the gain $G_{x,y,z}$ of the respective control loop, and an adder 86 which adds the respective theoretical speed $Vt_{x,y,z}(nT)$ at the instant being considered to the result of said product.

Without altering the concept of the invention, the details of execution and the embodiments may naturally be varied extensively with respect to what is described and illustrated by way of non-limitative example without thereby abandoning the scope of the invention.

In particular, the device 20 might be replaced with a single sequential logic unit, for example a microprocessor programmed to generate the law of motion along the arc or sub-arcs of the machine operative trajectory, to integrate the speed diagram related to said law of motion, to obtain the curvilinear coordinate of said trajectory, and to calculate the polynomial which represents the trajectory reduced to a recursive form of additions and multiplications.

We claim:

1. A polynomial interpolation device for the numeric control of machine tools, particularly milling machines for the machining of dies, comprising:
    a processor unit for generating polynomial coefficients along an operative trajectory arc of the machine tool;
    a first section which includes logic circuit means for generating a speed diagram of the machine tool along said operative trajectory arc and for calculating therefrom an instantaneous value of the curvilinear coordinates of said trajectory arc;
    a second section with a set of three digital polynomial generators, each of said digital polynomial generators receiving from said first section said instantaneous value of the curvilinear coordinates, and from said processor unit said polynomial coefficients, said digital polynomial generators of said second section comprising multiplier and adder means which are suitable for calculating from said polynomial coefficients and from said curvilinear coordinates a polynomial which represents the instantaneous position vector and the instantaneous speed vector of each point of said trajectory, the calculation being reduced to a recursive form of additions and multiplications of said polynomial coefficients and of said curvilinear coordinates.

2. Device as set forth in claim 1, wherein said logic circuit means of said first section generates said speed diagram according to a predetermined law of motion.

3. Device as set forth in claim 2, wherein said logic circuit of said first section generates said speed diagram according to the law of uniformly accelerated motion across the ends of said trajectory arc being considered.

4. Device as set forth in claim 3, wherein said logic circuit means of said first section generates said speed diagram by adding or subtracting constant-value acceleration steps.

5. Device as set forth in claim 4, wherein said logic circuit means of said first section is adapted to calculate said instantaneous value of the curvilinear coordinates of said trajectory by integrating said speed diagram.

6. Device as set forth in claim 5, wherein said processor unit includes a microprocessor-based external auxiliary system capable of mathematically defining a surface, and wherein said microprocessor-based system computes said polynomial coefficients related to the trajectory arc to be generated.

7. Device as set forth in claim 1, wherein said processor unit also generates sampling and sub-sampling pulses such that to control said first and said second sections to generate said instantaneous value of the curvilinear coordinates, said instantaneous position vectors and said instantaneous speed vectors at discrete time intervals.

8. Device as set forth in claim 7, wherein said logic circuit means of said first section comprises:
    first binary adder means which calculates, with each actual sampling pulse, the sum of a speed of said speed diagram at a preceding sampling pulse and of the positive or negative acceleration steps which are preset at the outputs of respective selectors;
    first binary accumulator means to store said sum;
    second binary adder means which integrates a value of the speed of said speed diagram at an actual sample pulse by adding to said value of the speed at an actual sampling pulse, the curvilinear coordinate related to the preceding sampling pulse, binary accumulator means being provided to store said curvilinear coordinate related to the preceding sampling pulse; and
    binary comparator means which compares the curvilinear coordinates related to the actual sampling pulse with the total curvilinear distance in order to recognize the end of the trajectory arc and to generate a signal indicating a new arc.

9. Device as set forth in claim 8, wherein said logic circuit means of said first section furthermore comprise binary multiplier circuit means which is suitable for calculating, at each sampling interval, the square of the generated speed, and binary comparator means which compares said squared value with a control value to provide a criterion for activating said selectors depending on whether acceleration or deceleration is to be performed along a sub-trajectory arc of said trajectory arc being considered.

10. Device as set forth in claim 9, wherein said logic circuit means of said first section furthermore comprise a logic circuit for generating said control value said logic circuit comprising:
    a binary subtractor which subtracts, at each sampling interval, the length of the sub-trajectory arc from the curvilinear coordinate;
    a first binary multiplier which performs the product of said subtraction and of twice the acceleration step;
    a binary adder which adds the output value of the multiplier to the square of the speed of exit from the sub-trajectory arc;
    two further binary multipliers which calculate the square of the product of the maximum allowed speed and of a percentage factor; and
    a digital comparator which compares the output of the first multiplier with that of the adder to drive two selectors which assign the lowest of the two values which enter said comparator to the comparison value.

11. Device as set forth in claim 1, wherein each said polynomial generator of the second section comprises a shift register for the parallel accumulation of the polynomial coefficients, and wherein a serial output of said shift register is operatively connected to a chain which comprises a binary multiplier, a binary adder and a binary accumulator which are suitable for calculating the polynomial which represents the trajectory reduced to a recursive form of additions and multiplications of the polynomial coefficients and of the curvilinear coordinate.

12. Device as set forth in claim 11, wherein the length of said shift register of each said polynomial generator is proportionate to the degree of the polynomial to be generated.

13. Device as set forth in claim 12, wherein said polynomial coefficients are accumulated, at each sampling interval, in said shift register and are transferred in a scalar manner to said binary adder at each sub-sampling pulse.

14. Device as set forth in claim 11, wherein the length of said shift register of each said polynomial generator is equal to the degree of the polynomial to be generated + 1.

15. Device as set forth in claim 11, wherein said binary multiplier computes, at each sub-sampling interval, the product of said curvilinear coordinate and of the output value of the adder related to the preceding sampling pulse, which is stored in said accumulator.

16. Device as set forth in claim 1, further comprising a microprocessor which is programmed to generate the law of motion along the machine operative trajectory arc, to integrate the speed diagram related to said law of motion, to obtain the curvilinear coordinate of said trajectory and to calculate the polynomial which represents the trajectory reduced to a recursive form of additions and multiplications.

* * * * *